(12) United States Patent
Parker

(10) Patent No.: US 7,409,424 B2
(45) Date of Patent: Aug. 5, 2008

(54) ELECTRONIC MAIL FILE ACCESS SYSTEM

(76) Inventor: James A. Parker, 2417 E. Hatcher Rd., Phoenix, AZ (US) 85028

( * ) Notice: Subject to any disclaimer, the term of this patent is extended or adjusted under 35 U.S.C. 154(b) by 1222 days.

(21) Appl. No.: 09/915,719

(22) Filed: Jul. 25, 2001

(65) Prior Publication Data

US 2003/0028600 A1    Feb. 6, 2003

Related U.S. Application Data

(60) Provisional application No. 60/286,077, filed on Apr. 24, 2001.

(51) Int. Cl.
G06F 15/16    (2006.01)
(52) U.S. Cl. .................................. 709/206; 709/232
(58) Field of Classification Search ................ 709/206, 709/232; 345/752
See application file for complete search history.

(56) References Cited

U.S. PATENT DOCUMENTS

| | | | |
|---|---|---|---|
| 5,418,908 A | 5/1995 | Keller et al. ................. 395/200 |
| 5,424,724 A | 6/1995 | Williams et al. ....... 340/825.05 |
| 5,493,692 A * | 2/1996 | Theimer et al. ............ 455/26.1 |
| 5,613,108 A | 3/1997 | Morikawa ................... 393/616 |
| 5,689,560 A | 11/1997 | Cooper et al. .................. 380/4 |
| 5,710,883 A | 1/1998 | Hong et al. ............. 395/200.17 |
| 5,771,355 A * | 6/1998 | Kuzma ........................ 709/232 |
| 5,781,901 A | 7/1998 | Kuzma ........................ 707/10 |
| 5,790,790 A | 8/1998 | Smith et al. ............ 395/200.36 |
| 5,790,793 A | 8/1998 | Higley ................... 395/200.48 |
| 5,815,663 A | 9/1998 | Uomini ................. 398/200.49 |
| 5,826,062 A | 10/1998 | Fake, Jr. et al. ............. 395/500 |
| 5,903,723 A * | 5/1999 | Beck et al. .................. 709/200 |
| 5,923,845 A | 7/1999 | Kamiya et al. ......... 395/200.36 |
| 5,923,846 A | 7/1999 | Gage et al. ............. 395/200.43 |
| 5,941,946 A | 8/1999 | Baldwin et al. ............. 709/206 |

(Continued)

FOREIGN PATENT DOCUMENTS

EP    0593384 B1    2/2000

(Continued)

OTHER PUBLICATIONS

"The Andrew Messages System", Web page printed Feb. 2001 from www.cs.cmu.edu/afs/cs.cmu.edu/project/atk-ftp/web/ams.html.

(Continued)

*Primary Examiner*—William C. Vaughn, Jr.
*Assistant Examiner*—Joseph R Maniwang
(74) *Attorney, Agent, or Firm*—Louis J. Hoffman (57) ABSTRACT

An electronic mail file access system (100) and associated methods permit a person (102) who originates or maintains a file to allow a person (198) authorized to view or edit a file to access the file by transmitting an electronic message to the file accessor. The file manager can conveniently select whether the file accessor will be able to modify the file or just view it. A file manager can grant one or more accessors viewing or editing access to a file (or multiple files) through transmission of a common electronic message, or through transmission of a separate message for each file or accessor. Variations and methods with different advantageous features are also described.

32 Claims, 7 Drawing Sheets

U.S. PATENT DOCUMENTS

| | | | | |
|---|---|---|---|---|
| 5,991,798 | A | 11/1999 | Ozaki et al. | 709/217 |
| 6,009,462 | A | 12/1999 | Birrell et al. | 709/206 |
| 6,014,688 | A | 1/2000 | Venkatraman et al. | 709/206 |
| 6,018,761 | A | 1/2000 | Uomini | 709/206 |
| 6,044,395 | A | 3/2000 | Costales et al. | 709/206 |
| 6,047,315 | A | 4/2000 | Tsuji et al. | 709/206 |
| 6,052,735 | A | 4/2000 | Ulrich et al. | 709/236 |
| 6,065,048 | A | 5/2000 | Higley et al. | |
| 6,088,702 | A | 7/2000 | Plantz et al. | 707/103 |
| 6,108,709 | A | 8/2000 | Shinomura et al. | 709/239 |
| 6,119,137 | A | 9/2000 | Smith et al. | 707/523 |
| 6,192,396 | B1* | 2/2001 | Kohler | 709/206 |
| 6,192,407 | B1 | 2/2001 | Smith et al. | 709/229 |
| 6,212,553 | B1 | 4/2001 | Lee et al. | 709/206 |
| 6,247,045 | B1* | 6/2001 | Shaw et al. | 709/207 |
| 6,266,692 | B1* | 7/2001 | Greenstein | 709/206 |
| 6,275,848 | B1* | 8/2001 | Arnold | 709/206 |
| 6,275,850 | B1* | 8/2001 | Beyda et al. | 709/206 |
| 6,327,612 | B1* | 12/2001 | Watanabe | 709/206 |
| 6,351,763 | B1* | 2/2002 | Kawanaka | 709/206 |
| 6,505,236 | B1* | 1/2003 | Pollack | 709/206 |
| 6,505,237 | B2* | 1/2003 | Beyda et al. | 709/206 |
| 6,628,306 | B1* | 9/2003 | Marchionda | 715/752 |
| 6,735,623 | B1* | 5/2004 | Prust | 709/219 |
| 6,920,482 | B1* | 7/2005 | Fujiyoshi | 709/206 |
| 2001/0047389 | A1* | 11/2001 | Prahlad et al. | 709/206 |
| 2001/0054073 | A1* | 12/2001 | Ruppert et al. | 709/206 |
| 2002/0013817 | A1* | 1/2002 | Collins et al. | 709/206 |
| 2002/0059382 | A1* | 5/2002 | Yamaguchi et al. | 709/206 |
| 2002/0105545 | A1* | 8/2002 | Carter et al. | 345/752 |
| 2002/0112010 | A1* | 8/2002 | Soroker et al. | 709/206 |
| 2002/0116641 | A1* | 8/2002 | Mastrianni | 713/201 |
| 2002/0138586 | A1* | 9/2002 | Paleiov et al. | 709/207 |
| 2002/0174010 | A1* | 11/2002 | Rice, III | 705/14 |
| 2004/0049696 | A1* | 3/2004 | Baker et al. | 713/201 |

FOREIGN PATENT DOCUMENTS

| | | |
|---|---|---|
| WO | WO 98/58332 | 12/1998 |
| WO | WO 99/26121 | 5/1999 |
| WO | WO 00/45321 | 8/2000 |
| WO | WO 00/60503 | 10/2000 |
| WO | WO 00/60837 | 10/2000 |
| WO | WO 00/67119 | 11/2000 |
| WO | WO 01/22246 A1 | 3/2001 |

OTHER PUBLICATIONS

"Calypso E-Mail Quick Reference", Web page printed 2000 from mcsdallas.com/mcs/calypso/quickrefMain.htm, (pp. 1, 20, of 23 only).

"Web E-Mail Basics", Web page printed 2000 from library.mcneese.edu/help/webemail.htm.

"Endymion Corporation", *Sake Mail*, Web page printed 2000 from www.endymion.com/products/sake/mail.

"Endymion Corporation", *MailMan*, Web page printed 2000 from www.endymion.com/products/mail/professional.htm.

"Endymion Corporation", *Announce*, Web page printed 2000 from www.endymion.com/products/mailman/.

"Tumbleweed Communications", *MMS Products Overview*, Web page printed 2000 from www.tumblewee.com/en/solutions/products/mms_products/index.html.

"Tumbleweed Communications", Press Release, Oct. 6, 1997.

"Tumbleweed Communications", *Enterprise Archiving*, Web page printed 2000 printed from www.tumbleweed.com/en/solutions/products/mms_products/enterprise_archiving/index.html.

"Tumbleweed Communications", *IME Products Overview*, Web page printed 2000 from www.tumbleweed.com/en/solutions/products/ime_products/index.html.

"Tumbleweed Communications", Press Release, Jul. 30, 1998.

"Web_Bound Attachments Remove Some Burden From E-Mail Servers", *PC Week*, Nov. 23, 1998.

"Endymion Corporation", *Frequently Asked Questions for MailMan Version 3.0*, Web page printed 2000 from www.endymion.com/products/mailman/mmfaq.htm.

"Remote Backup: CoreDate Remote Worx 2.1", TechWeb Review, Oct. 12, 1998.

"CoreData", *Business Wire*, Sep. 18, 1998.

"An Easty-To-Use System for Document Collaboration", Internet World, Feb. 8, 1999.

"Bring Remote and Mobile Workforce Backup and Data Retrieval to the Enterprise", White Paper, dated Sep. 1998.

"ServerMax extends disk space", InfoWorld, Mar. 23, 1998.

Supplementary European Search Report, from European counterpart App. No. EP 02 80 7498 (from PCT/US02/41868); Sep. 13, 2006.

Novell, Inc.: Groupwise User's Guide for Windows 32-bit; Chapters 3, 9, and 15; pp. 1-4, 21-40, 158-228, 301-307; 1998.

* cited by examiner

ELECTRONIC MAIL FILE ACCESS SYSTEM

CROSS-REFERENCE TO RELATED APPLICATIONS

This application claims the benefit of provisional application Ser. No. 60/286,077, filed Apr. 24, 2001, incorporated herein by reference.

BACKGROUND OF THE INVENTION

Colleagues in workgroups increasingly rely on electronic messaging to exchange and collaborate on electronic files. With the increased use of the Internet to connect remote participants in workgroups, colleagues often find themselves unable to reach a common point at which they can safely and conveniently store and access shared files. Even where such access is possible (e.g., within a local area network or via an Internet-based virtual private network), workgroup participants often gravitate to the convenience and familiar interface of electronic mail and wind up passing files back and forth as electronic mail (e-mail) attachments.

Collaborative access to electronic files via e-mail attachments can be inefficient for a number of reasons. Transmission of files as attachments consumes significant network resources. This problem is worsened due to the inefficient base-64 encoding that e-mail systems conventionally employ. Recipients of electronic mail messages with large attachments may become annoyed at experiencing lengthy download times when checking their e-mail, particularly when connecting over slower telephone lines. Many users may prefer to access shared files when and if they wish, rather than having files "pushed" into their e-mail in-boxes.

In a collaborative workgroup, managing access and version control of shared files can pose an even more significant problem for simple attachment-based file sharing. After sending a version of a file to a colleague via e-mail attachment, a file originator or author loses control of edits made to that version by the colleague. Implementing such edits in the "official" version of the file requires the file originator to overwrite the original file with an edited version sent back to the originator via another e-mail attachment. Implementing edits made by multiple colleagues requires the originator to merge edits manually.

International Patent Application No. WO 00/60503 of Serbinis et al. discloses a document-management system in which a file originator uploads it to a document-management system store and lists users authorized to access the document. But even with the disclosure of Serbinis, there remains a need to more seamlessly integrate document management with e-mail systems, to promote convenience and help discourage users from falling back on the familiar but inefficient system of sending files by attachment. Better e-mail/document integration would provide the convenience and familiar interface of sending files as attachments while maintaining the benefits of network access to shared files.

SUMMARY OF THE INVENTION

In systems and methods according to various aspects of the present invention, a file manager enables a file accessor to access the file by transmitting an electronic message to the file accessor. (A file manager is a person who originates or maintains a file, and a file accessor is a person authorized to view or edit the file. An example of an electronic message is a MIME-encoded e-mail.) Advantageously, the file manager can conveniently select whether the file accessor will be able to modify the file or just view it. A file manager can grant one or more accessors viewing or editing access to a file (or multiple files) through transmission of a common electronic message or through transmission of a separate message for each file or accessor.

The various systems and methods can advantageously display an electronic message window (e.g., an e-mail client's "compose new message" window) that includes a "file viewer" field and a "file editor" field, in addition to one or more conventional message recipient fields. The file manager, can enter one or more message addresses. The file manager, in the file viewer field, the file editor field, or both. With these additional fields, a file manager can conveniently manage viewing and editing access to the file using novel extensions of the familiar user interface found in conventional electronic messaging systems.

The labels "VIEWER:" and "EDITOR:", respectively, or linguistic equivalents to those terms, can accompany and visually identify file viewer and file editor fields according to various aspects of the invention. A primary message recipient field can be conventionally labeled "TO:" or a linguistic equivalent. Message recipient fields can further include a conventional secondary message recipient field (e.g., labeled "CC:" or equivalent) and a secret secondary message field (e.g., labeled "BCC:" or equivalent).

The electronic message is sent to the recorded address or addresses, and file data is transmitted separately from the electronic message. Typically, this second transmission of the file data occurs upon recognizing a file accessor's request for direct access. The electronic message can include a reference identifying a location of the file to initiate data file transmission.

The various inventive systems and methods can transmit the electronic message as a propagated signal embodied in a message-encoded data stream having a series of data frames, including (1) indicia identifying the file to which access is being authorized; (2) an address frame specifying one or more recipients of the message; and (3) file viewer and file editor address frames that include headers and respective sets of associated indicia. The associated indicia includes identification of a recipient as a viewer or editor, depending on whether the indicia is in a file viewer or file editor address frame. If the file manager wishes to grant only viewing access, the file editor address frame can be left blank. If the file manager wishes to grant editing access to all accessors, the file viewer address frame can be left blank.

A method according to various aspects of the invention includes modification of the operation of an electronic message program, causing it to include a file viewer field and a file editor field in a displayed electronic message window. A software plug-in can perform the method to make conventional e-mail client software capable of implementing the various inventive file access systems and methods.

Advantageously, the various systems and methods can automatically determine whether a file accessor is authorized for direct file access or not, based on the address associated with the accessor. The determination can be based, for example, on a network domain of the address (e.g., "@uspto.gov") or by looking up the address in a database of authorized accessors. Appropriately authorized accessors are permitted to access one or more files directly, typically via a reference (e.g., an executable code attachment or hyperlink) transmitted with the electronic message. Accessors not granted direct file access can instead receive data of the file as an attachment to the electronic message.

The above summary does not include an exhaustive list of all aspects of the present invention. Indeed, the inventor contemplates that the invention includes all systems and methods that can be practiced from all suitable combinations of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

FIG. 6, including two partial views labeled FIG. 6A and FIG. 6B, depicts a propagated signal embodied in a message-encoded data stream according to various aspects of the invention.

DETAILED DESCRIPTION OF PREFERRED EXEMPLARY EMBODIMENTS

An electronic mail file access system according to various aspects of the present invention provides numerous benefits, including convenience of access management arising from the use of novel extensions to the familiar user interface employed by typical e-mail software. Such a system suitably includes any group of hardware or software components that can interact to facilitate file access via electronic messaging. For example, system 100 of FIG. 1 includes a first computer 110, a second computer 140, and a third "access server" computer 170, suitably networked together via conventional network connections 14, 17, and 47.

Figure 1:
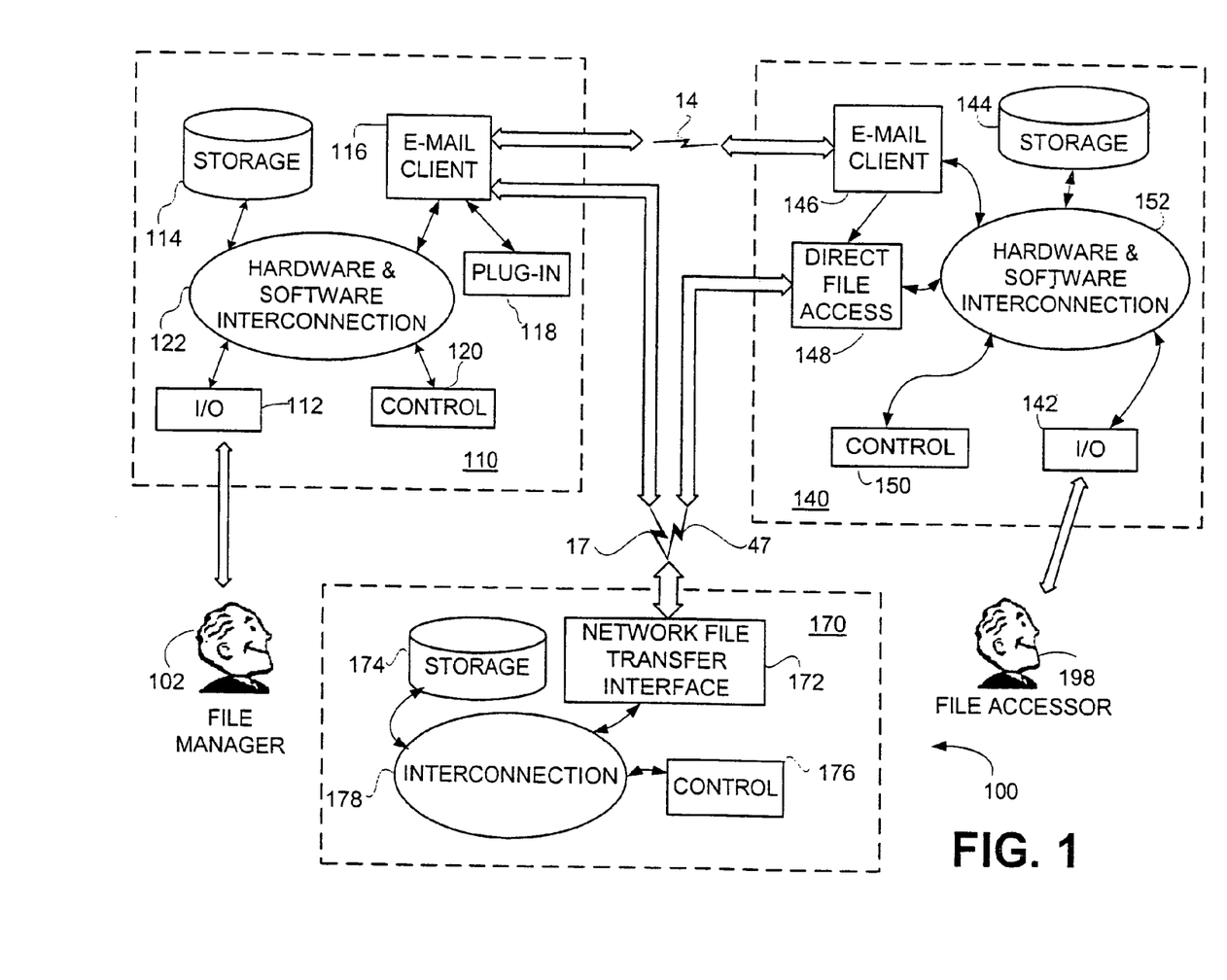
FIG. 1 is a schematic block diagram of an electronic file access system according to various aspects of the present invention.

FIG. 1 schematically depicts computers 110, 140, and 170 as dashed boxes, and schematically depicts functional modules that those computers implement in system 100 as schematic symbols within each respective computer's dashed box. These functional modules can be suitably implemented by hardware, software, or both. Functional modules can interact via any suitable routes of interconnection, including hardware (e.g., a bus, dedicated signal lines, etc.), access to shared storage media (e.g., arguments and returned values of function calls in RAM media, dual-access RAM, files residing on hard disk media, etc.), and combinations of hardware and shared media access.

Computer 110 implements functional modules including I/O (input/output) module 112, storage 114, and an e-mail client application 116 modified by a plug-in 118. Control module 120 manages operation of these modules and any others that computer 110 implements. Hardware and software interconnection module 122 represents interconnection between the various modules of computer 110.

Computer 140 implements functional modules including I/O 142, storage 144, an e-mail client application 146 and a direct file access module 148. Control module 150 manages operation of these modules and any others that computer 140 implements. Interconnection between the various modules of computer 140 is represented by hardware and software interconnection module 152.

Access server 170 implements functional modules to provide network access to files in a storage module 174. Server 170 includes, in addition to storage 174, a network file transfer interface module 172 and a control module 176. Interconnection module 178 represents hardware and software interconnection between the various modules of computer 170.

An I/O functional module according to various aspects of the invention includes any hardware or software that accepts input from a user and conveys output to the user. In system 100, the user of computer 110 is a person 102 acting as a file manager, and the user of computer 140 is a person 198 acting as a file accessor. I/O module 112 of computer 110 accepts conventional user input (e.g., mouse and keyboard input, voice dictation and commands) from file manager 102, who directs operation of computer 110. I/O module 112 conveys output from computer 110 to file manager 102 via conventional output devices (e.g., an LCD or CRT monitor, speakers) not shown in FIG. 1. Similarly, I/O module 142 of computer 140 accepts input from, and conveys output to, file accessor 198. Although computer users appear as humans at the computers, the invention allows for persons not present at the computers at all times, or "present" only through remote links. Also, the person can be replaced with artificial intelligence systems or robots.

Exemplary storage modules 114, 144, and 174 of computers 110 and 140 and access server 170 conventionally include hard disk storage, RAM, and boot ROM. A storage functional module according to various aspects of the invention can include, in addition to the hardware and software employed in modules 114 and 144, any hardware and associated software that suitably stores data. Storage may be temporary or permanent, in volatile or nonvolatile media.

Control modules 120, 150, and 176 of computers 110 and 140 and access server 170 conventionally include one or more central processing unit (CPU) integrated circuits with embedded microcode, boot software (e.g., in a BIOS chip), and a suitable software operating system, e.g., Linux, BeOS, MacOS, WINDOWS, etc. (A control module according to various aspects of the invention can include this exemplary hardware and software or any other that controls operation of a computer.) Once the software operating system takes control of the CPU, it manages interaction of other components in the CPU's computer. For example, control module 120 manages the exchange of data between I/O module 112, a hard disk and memory in storage module 114, and application function calls implementing e-mail client module 116 and plug-in module 118, the exchange being represented by hardware and software interconnection module 122.

An e-mail client module according to various aspects of the invention includes any functional module implemented by any suitable hardware and software combination that permits a user to exchange electronic messages with another user via a network connection. When suitably modified for purposes of implementing aspects of the invention by plug-in module 118, exemplary e-mail client module 116 can be a conventional e-mail client application and still perform functions (discussed below) in system 100. Suitable e-mail client applications include NOTES (Lotus/IBM), EUDORA (Qualcomm), MESSENGER (Netscape), and OUTLOOK (Microsoft). Alternatively, such function can be integrated into application module 116, in which case plug-in module 118 may be omitted.

E-mail client module 146 of computer 140 need not be specially coded or modified by a plug-in module to perform its functions in system 100. Exemplary computer 140 includes direct file access module 148 (preferably launched as an e-mail attachment) to perform such functions. In variations where the benefits of a direct file access module are not required, a file accessor can just employ a conventional e-mail client. In such variations, direct file access can be initiated by selection of a hyper-link embedded in an e-mail message, avoiding the need for a direct file access module. In other variations, a file accessor can employ a specially coded electronic mail client or one modified by a plug-in. Accordingly, a system according to various aspects of the invention can operate without retrofitting all e-mail software for file accessors.

Code residing within a single dynamic-linked library (DLL) file can implement plug-in module 118, at least within the EUDORA e-mail client in variations employing that client. An installation program can store the DLL file in a "plugins" folder (e.g., "C:\Program Files\Eudora\plugins") on a hard disk of storage module 114. Other e-mail clients implement plug-ins in different ways.

Figure 2:
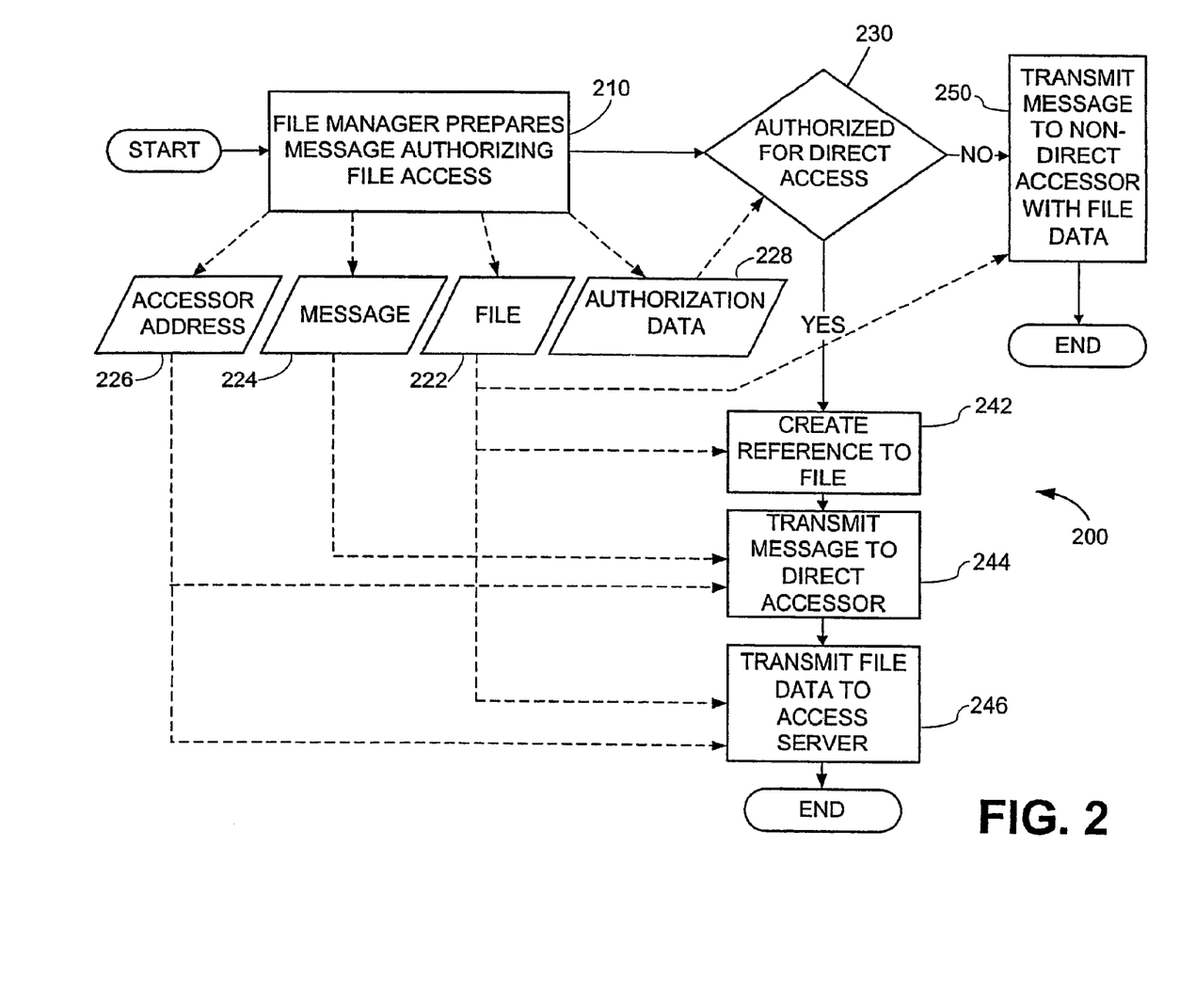
FIG. 2 is a data flow diagram of a method for transmitting file data in the system of FIG. 1.

An exemplary method 200 for message and file transmission in system 100 may be better understood with additional reference to the data flow diagram of FIG. 2. This example illustrates benefits of various aspects of the invention when such aspects are employed in the exemplary configuration of system 100. However, certain aspects can provide benefits even when various other aspects are omitted. Thus, neither this nor any other example provided herein should be considered as limiting the scope of the invention in any way; that limiting function is reserved exclusively for the issued claims.

In process 210 of method 200, the file manager (not shown in FIG. 2) prepares a message authorizing file access. To do so, file manager 102 interacts with computer 110 via input and output communicated through I/O module 112. (See FIG. 1.) The file manager identifies a file 222 (resident on a hard disk or other media of storage 114 of FIG. 1) to which he or she wishes to authorize access by a file accessor. The file manager typically is the author of files to which he or she grants access, though this need not be the case.

The file manager identifies an electronic message address 226 of the file accessor. With functional modifications from plug-in module 118, module 116 (FIG. 1) further records indicia of whether file accessor 198 is a viewer authorized to view the file or an editor authorized to modify the file. (Naturally, authorization to modify a file implies concurrent authorization to view it.)

In conventional electronic mail systems, an electronic message address includes a user's ID followed by the "@" symbol, which is followed by a network domain name of the user. For example, the address "tom_edison@lightbulbs.com" includes the user ID "tom_edison" and the domain name "lightbulbs.com". Given a compatible infrastructure, other types of electronic message addresses can be employed.

Method 200 continues with process 230, which determines authorization status of the file accessor. Process 230 (which computer 110, access server computer 170, or perhaps computer 140 of FIG. 1 can execute), relies on authorization data 228 to make this determination. Authorization data 228 can be automatically determined or the file manager can supply it manually. Exemplary systems and methods for manual determination of authorization data are discussed below with reference to FIGS. 4-5.

Authorization data for a given file accessor can be automatically determined based on the electronic message address associated with the file accessor, using any suitable technique. In system 100 of FIG. 1, for example, an authorization database module (not shown, but which may be located on storage 114) in computer 110 maintains a database of authorized accessors and authorization status for each. The authorization database module can look up the address of file accessor 198 and, if a match is found, update authorization data 228 (FIG. 2) to identify accessor 198 as a viewer or editor with direct access authorization or as an accessor with no direct access authorization.

In addition or alternatively, system 100 can automatically determine authorization data based on the user ID or domain name of file accessor 198. For example, all addresses having the same corporate domain name as the address of file manager 102 may be associated with data authorizing direct file access. As another example, all addresses having the domain name of commonly known free e-mail services may be associated, out of security concerns, with data that blocks authorization of direct file access. In a variation where both automatic and manual authorization determination are employed in combination, such blocking can be assigned a higher priority to override any user authorization.

Exemplary method 200 (FIG. 2) continues with either process 250 or processes 242, 244, and 246, depending on the authorization status determined at process 230. If accessor address 226 is not authorized for direct access to file 222, process 250 conventionally transmits a copy of file 222 as an attachment to message 224. If address 226 is authorized for direct file access, however, process 242 creates a reference to file 222. Process 244 then transmits message 222 to the file accessor with the reference attached to message 222 or integrated into it. Process 246 then transmits data of file 222 to access server 170 via network connection 17 (see FIG. 1).

In variations of system 100 (FIG. 1), computer 110 can send file references instead of file attachments when direct file access is requested. Computer 110 can do so even with an entirely unmodified e-mail client module or one that is only modified to include viewer and editor fields. In such variations, computer 110 can implement an additional module (not shown) that detects API calls for attachment of a file to an e-mail message. If direct file access is requested, such a module can trick e-mail client module 116 into instead attaching a file of executable code that references the desired file. Alternatively, computer 110 can implement a firewall-type module (also not shown) that detects the presence of a file attachment in a message, just before transmission via network connection 14. The firewall-type module can replace file attachments with file references and transmit data of the formerly attached file to access server 170 via network connection 17.

In system 100 and method 200 of FIGS. 1 and 2, access server 170 receives data of file 222 through network file transfer interface 172. Server 170 stores the data in storage 174, from which file accessor 198 can eventually obtain it to view or edit file 222, depending on his or her level of authorization. In variations where the benefits of an access server according to various aspects of the invention are not required, it can be omitted. In such a variation of system 100, as an example, computer 140 can connect to computer 110 via network connection 14 for direct file access, omitting server 170.

A file reference according to various aspects of the invention includes any indicia identifying a location of a file. A file reference can be a hyperlink. In that case, it includes both human-readable indicia (e.g., a file name) and associated machine-readable indicia (e.g., a network address from which the file can be retrieved). In one variation, a file reference can consist of just text identifying a network address, which a file accessor can enter into a suitable field (e.g., an address field of a Web browser) to retrieve the file.

In a particularly advantageous variation, a file reference can be a message attachment that includes code implementing a direct file access module, e.g., module 148 of system 100. A direct file access module according to various aspects of the invention includes any functional module implemented by any suitable hardware and software combination that facilitates direct file access. Advantageously, sending code to a file accessor that implements a direct file access module dispenses with the need for direct file access capability in that person's e-mail client. U.S. Pat. No. 6,014,688 to Venkatraman et al. contains disclosure that may be helpful in implementing this variation.

To enhance security by ensuring that only persons granted a specific level of authorization are able to exercise that authorization, a file reference is preferably encrypted or passed through a one-way cryptographic function. Encrypting the reference, either to a public key of a designated accessor or with a shared secret key known only to the accessor and the file manager, can prevent persons other than the designated accessor from using the file reference. Passing the file reference through a one-way cryptographic function (e.g., including a user ID, a file ID, and a time ID at the input) can prevent interlopers from discerning the name of the file based on its reference. Variations that do not encrypt the reference preferably employ alternative access control measures such as requiring a password or passphrase or only permitting SSL connections to authorized network addresses.

U.S. patent application Ser. No. 08/877,065 filed Jun. 17, 1997 and Ser. No. 09/092,132 filed Jun. 5, 1998, listed as priority documents in PCT application WO 98/58332 published Dec. 23, 1998, contain disclosure that may be helpful in enhancing security of file references.

When operating in accordance with method 200 of FIG. 2, e-mail client module 116 in computer 110 (FIG. 1) transmits message 224 to e-mail client module 146 in computer 140, under control of file manager 102. With direct file access authorization, file accessor 198 can then access file 222 (FIG. 2) separately from message 224. Accessor 198 of file 222 and any other authorized accessors can obtain and (if authorized as editors) modify data of file 222 via access server 170. This regulated and usually bandwidth-intense file access occurs over network connection 47, separately from network connection 14 between computers 110 and 140. Thus, network connection 14 can be realized with a low-bandwidth and sporadic connection without affecting quality of access to file 222, once it has been stored in access server 170.

Any suitable connection equipment and communication protocols can be employed to implement network connections 14, 17, and 47. Examples of suitable connections include twisted-pair cable, fiber-optic cable, spread-spectrum wireless (infrared or RF), RF satellite relay, and audio-modulated telephone connections. Examples of suitable communication protocols at various layers include ATM, TCP/IP, HTTP, FTP, NetBEUI, symmetric or public key encryption. Typical implementations of system 100 employ multiple types of connections and protocols, especially when network connections 14, 17, and 47 span a wide-area, platform-independent network such as the Internet.

In a particularly advantageous variation of system 100, computer 110 can transmit electronic message 224 to computer 140 under low-bandwidth or otherwise non-ideal conditions while deferring transmission of file 222 to access server 170. Such a system monitors the condition of network connection 17 and transmits file 222 when connection 17 improves to a suitable quality level. The quality level is preferably determined based on speed, but can also account for interruption frequency.

Deferral of file transmission can be analyzed by any suitable technique using any suitable standards. In an exemplary technique, computer 110 determine conditions of that connection by analyzing packets sent across network connection 14 during transmission of a message sent to a file accessor. If the timing of the packet transmission indicates (by the predetermined standard) that connection 17 has unsuitable quality for transmission of a file "attached" by reference, computer 110 defers that transmission until conditions improve. Computer 110 can also periodically monitor conditions by analyzing packets sent during transmission of electronic messages other than the one to which the file is attached or during retrieval of Internet Web pages. One of many possible alternatives to this technique is for computer 110 to check for whether it has a local area network connection or a modem connection active and to defer file transmission until the local area network connection becomes active. Another alternative (based on transmission latency) is "pinging" access server 170 and determining transit times.

U.S. patent application Ser. No.: 60/065,533 filed Nov. 13, 1997; Ser. No. 60/085,427 filed May 14, 1998; and Ser. No. 60/100,962 filed Sep. 17, 1998, listed as priority documents in PCT application WO 99/26121 published May 27, 1999, contain disclosure that may be helpful in implementing deferred file transmission.

Figure 6A:
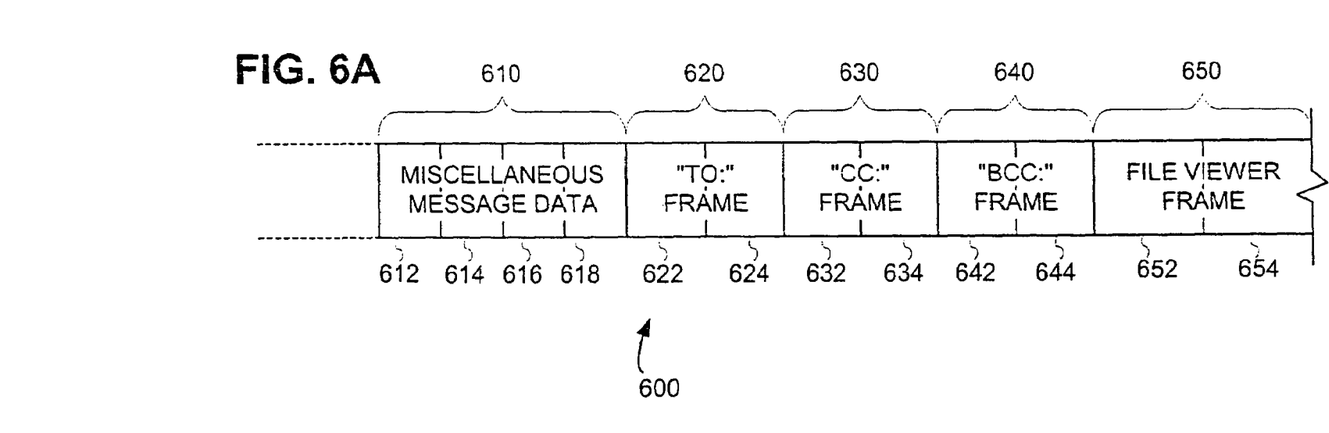
Figure 6B:
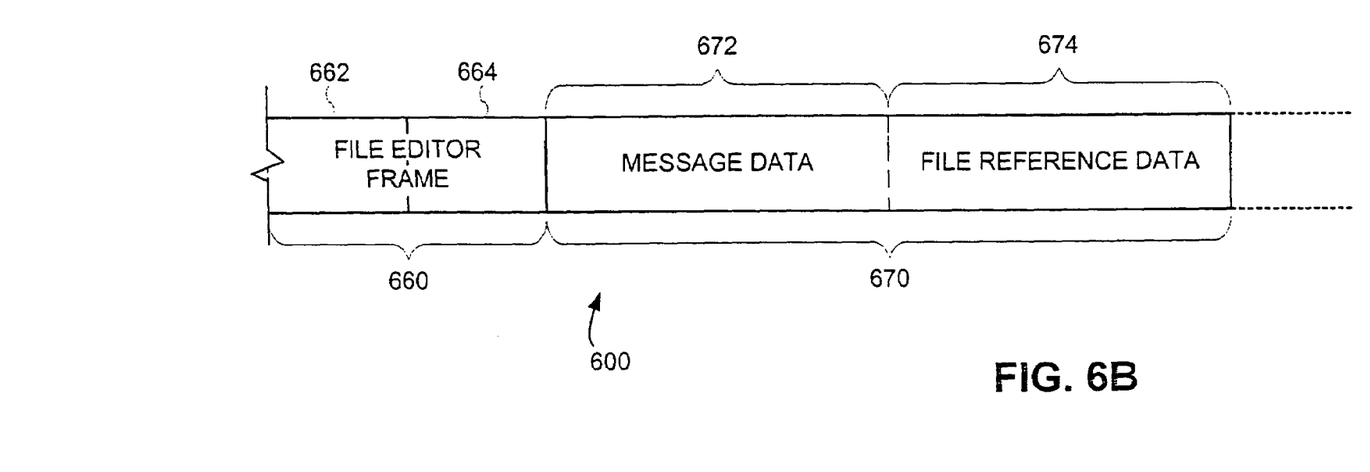

An exemplary signal for transmission of an electronic message according to various aspects of the invention may be better understood with reference to FIG. 6. Propagated signal 600, which begins in the view of FIG. 6A and ends in the view of FIG. 6B, includes a series of data frames. Any suitable type of signal having a series of data frames (in parallel or serial format, in contiguous sequence or interspersed with unrelated data) can be employed.

Frame 610, which includes subframes 612-618, includes miscellaneous message data that identifies the message and permits conventional systems to process it using an established message transmission protocol, e.g., MIME.

Frames 620-660 each include two subframes. Subframes 622, 632, 642, 652, and 662 include headers identifying each frame's contents. Subframes 624, 634, 644, 654, and 664 include respective sets of indicia (e.g., ASCII text of e-mail addresses) associated with each respective header. Some of frames 620-660 may be left blank, containing only a header identifying the frame.

Frames 620, 630, and 640 are message recipient frames. These frames can convey one or more addresses of message recipients who have been identified in conventional fields (here, "TO:", "CC:" and "BCC:" fields) of a message window. Frames 650 and 660 can convey one or more addresses of message recipients who have been identified as viewers or editors authorized for direct viewing or editing access to a file referenced in the message, respectively.

Frame 670, which includes subframes 672 and 674, conveys the actual information of the message. For messages sent with attached files (e.g., to persons not authorized for direct file access), subframe 674 can includes actual data of the attachment. As depicted in FIG. 6B, however, message signal 600 includes data 674 referencing the file. As discussed above, this reference data can include, for example, code that implements a direct file access module when executed or a hyperlink.

Figure 3:
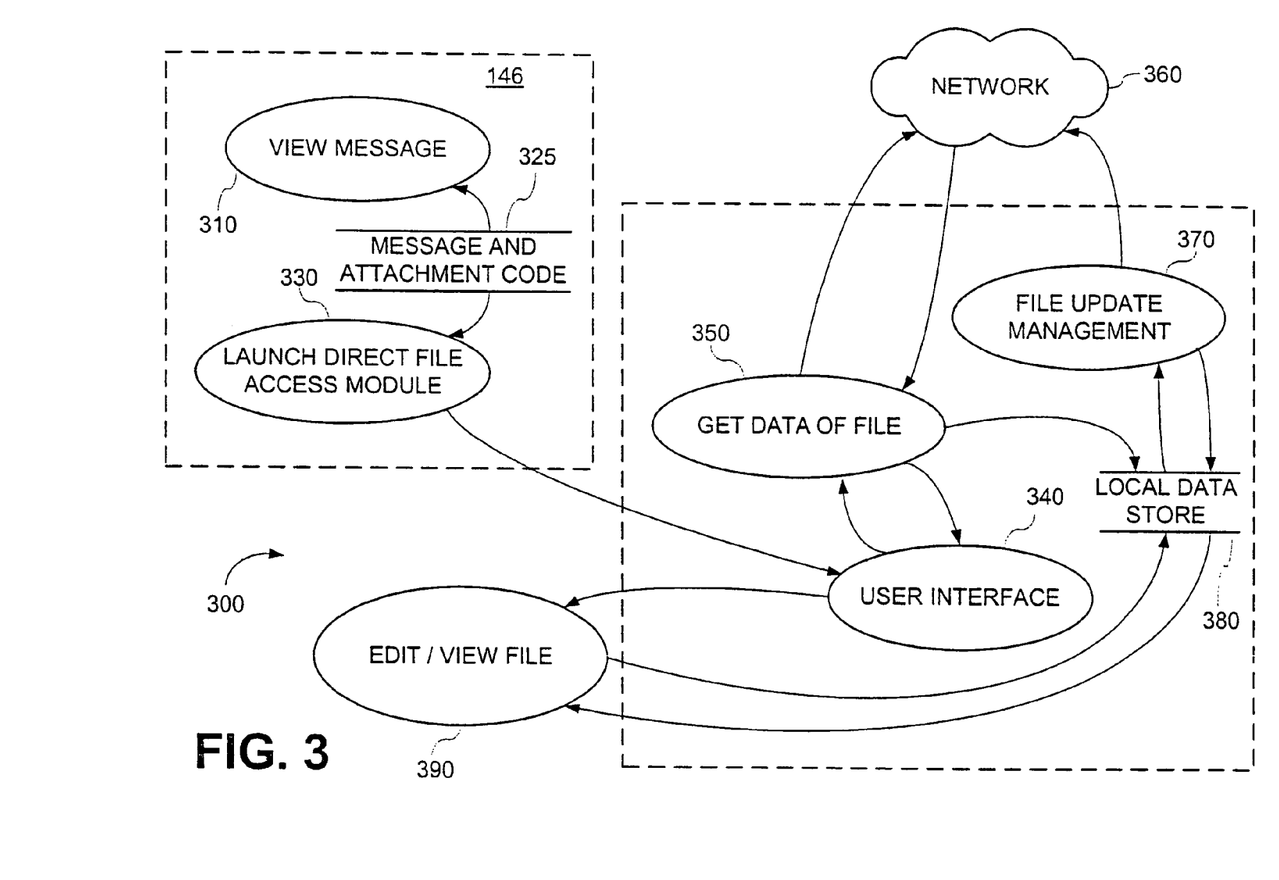
FIG. 3 is a data flow diagram of a method for accessing data transmitted by the method of FIG. 2.

An exemplary method 300 for file access in system 100 may be better understood with reference to FIG. 3. (Again, neither this nor any other provided example limits the invention.) Computer 140 of FIG. 1 performs method 300 during operation of direct file access module 148.

Method 300 begins (process 310 of FIG. 3) with file accessor 198 (FIG. 1) viewing message 325 (FIG. 3) using e-mail client module 146. Message 325 is a copy of data from message 222 (FIG. 2), received at computer 140 from computer 110 via network connection 14 (FIG. 1). Message 325 also includes a reference to file 222 of FIG. 2. In exemplary system 100 and methods 200 and 300, this reference is a code attachment, which file accessor 198 can execute to implement direct file access module 148.

Method 300 continues (process 330 of FIG. 3) with launching of direct file access module 148, which then carries out processes 340, 350, and 370. (FIG. 3 depicts these latter processes inside a dashed box labeled with the reference number of module 148.) Process 340 presents a user interface to the file accessor. This user interface can be as simple as a dialog box asking the user to confirm whether he or she wants to access a specified file. User interface process 340 can be omitted entirely if opening a single file automatically upon launch of module 148 is acceptable.

A more complex and full-featured interface, for accessing multiple files or folders in accordance with various aspects of the invention, has the look and feel of the familiar file management interfaces provided in conventional operating systems. For example, the user interface can provide a view of multiple subfolders within a folder in which a file manager has authorized access to various files. With such an interface, a file accessor can easily select particular files that he or she wishes to view or modify (depending on the authorization level granted) without needing to retrieve data of other files.

User interface process 340, as directed by file accessor 198, cooperates with process 350 to obtain data of file 222 (FIG. 2) from access server 170 (FIG. 1). This process may be better understood with reference to FIG. 1, as everything happening outside computer 140 is represented schematically in FIG. 3 by network cloud 360. During process 350, direct file access module 148 of computer 140 communicates with network file transfer interface 172 of access server 170, which retrieves file 222 from storage 174 and transmits data of file 222 to module 148 via network connection 47.

Process 350 stores data of file 222 in a local data store 380 (see FIG. 3), which computer 140 maintains within storage module 144. User interface process 340 can then transfer user interface focus to an editing or viewing process 390 (e.g., in a new user interface window). File accessor 198 can then view or modify file 222 using an appropriate software module. For example, accessor 198 can view or edit a text document with a word processor.

Access to file 222 in exemplary method 300 occurs indirectly, via a cached copy of the file within local data store 380. Advantageously, any modifications made to file 222 are first made to the cached copy and only later applied to the original file in storage 174 of access server 170. Process 370 determines when updates to the original file 222 are appropriate based on the state of the cached copy in local data store 380. Process 370 then communicates with server 170, as schematically represented by network cloud 360, and performs the updates accordingly.

The deferred file modification of exemplary method 300 advantageously accesses the file locally, i.e., within computer 140, reducing the amount of network traffic required for extensive file viewing and modification. In addition, deferred modification can simplify version control of modifications to the original file 222. As discussed below with reference to FIGS. 7-10, files can be updated with editors' modifications using a block or byte differencing scheme.

An advantageous variation of a direct file access module according to various aspects of the invention includes a drive mapping user interface. Such an interface permits access to a folder or folders in storage module 174 of server 170 (FIG. 1) much as if the folder contents were actually maintained within computer 140.

Exemplary methods 700 and 800 for coordinating modifications to a directly accessed file in accordance with various aspects of the invention may be better understood with reference to FIGS. 7-10. As above, modifications to example file 222 (FIG. 2) are discussed in the context of exemplary system 100 (FIG. 1) and methods 200 and 300 (FIGS. 2 and 3).

Figure 7:
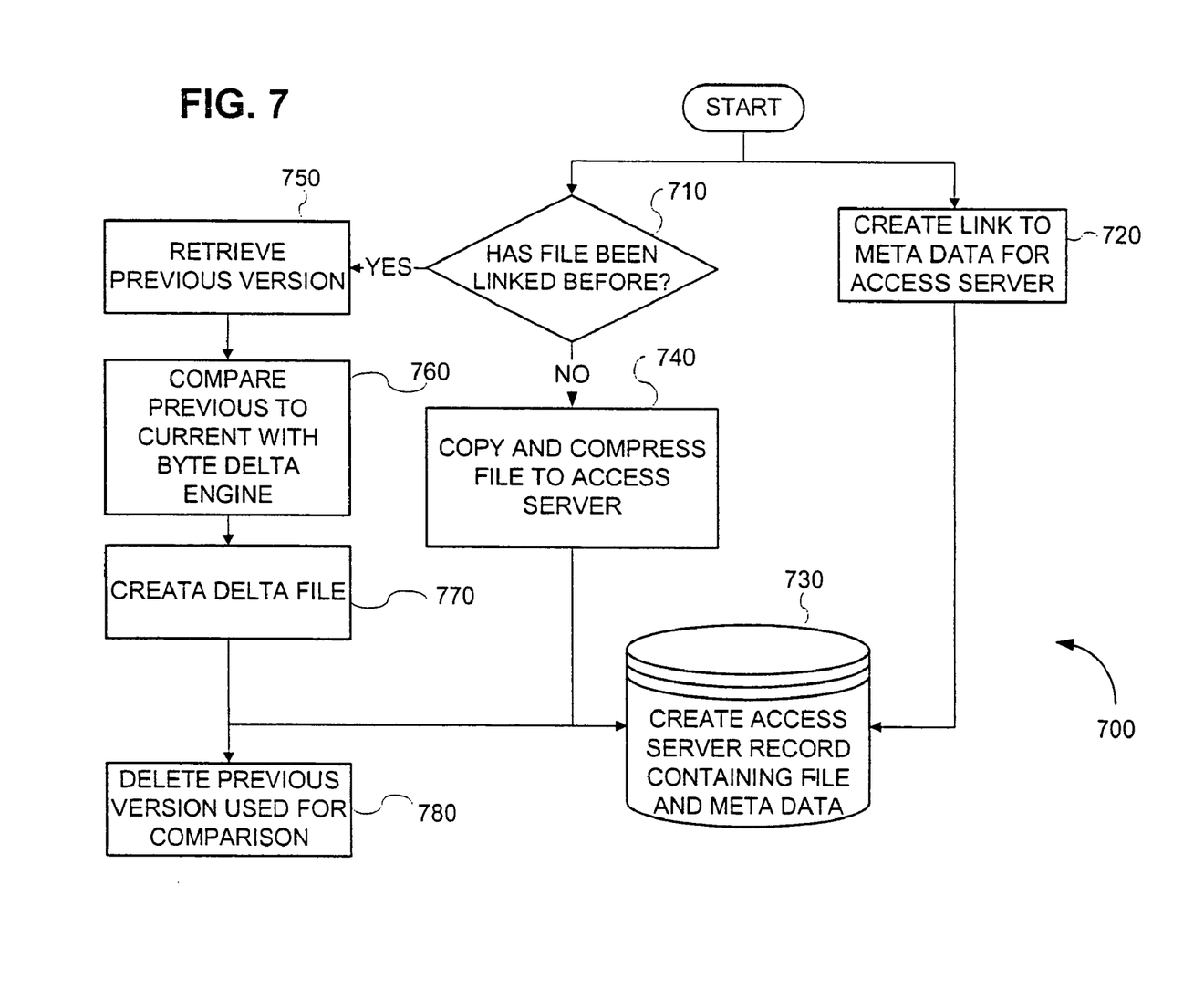
FIG. 7 is a functional flow diagram of processing performed to maintain file modifications using byte differencing according to various aspects of the invention.

FIG. 7 is a functional flow diagram of a method 700 for maintaining file 222 with byte differencing. Method 700 begins with two parallel steps. Decision step 710 determines whether file 222 has been directly accessed by (e.g., linked to) a file editor. Without depending on the result of decision step 710, step 720 creates a reference (e.g., a link) to data of file 222 at access server 170.

If file 222 has been directly accessed before method 700 (or at least before the instance of method 700 depicted in FIG. 7) by a file editor, processing proceeds to step 750, which retrieves the previous version of file 222. Process 760 then compares the previous version to the current (i.e., accessor-modified) version with a byte delta engine. A byte delta engine compares individual bytes of two files, using any suitable hardware and software, and produces indicia of differences between the individual bytes. Processing then proceeds to process 770, which creates a delta file including such indicia. Process 770 sends the delta file to access server 170 along with the reference created at process 720, as depicted by storage process 730. (The delta file is preferably sent in a suitably encrypted and compressed form.) At concluding process 780 of method 700, the previous version of file 222 is optionally deleted.

If file 222 has not been directly accessed before method 700 by an editor, process 740 simply compresses file 222 (preferably encrypting it as well) and transmits it (e.g., using method 200) from computer 110 of file manager 102 to access server 170. No person with authorization to modify file 222 has accessed it, and no differencing is necessary.

Figure 8:
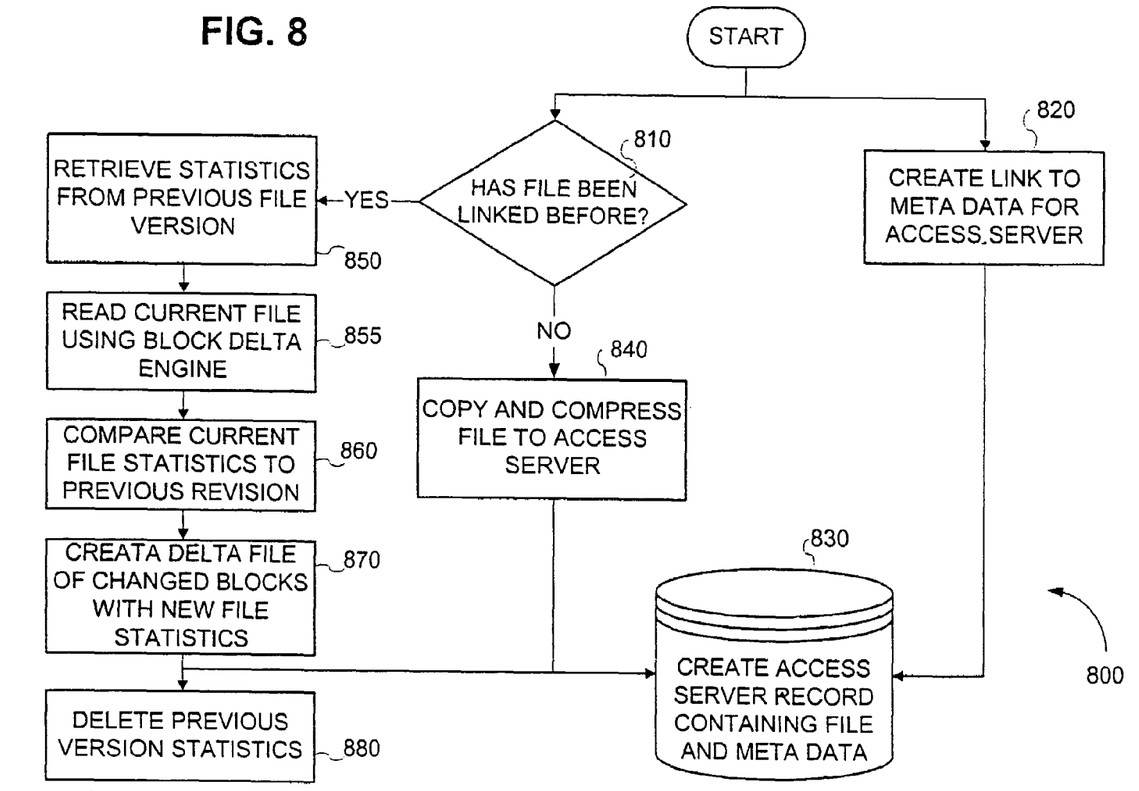
FIG. 8 is a functional flow diagram of processing performed to maintain file modifications using block differencing according to various aspects of the invention.

FIG. 8 is a functional flow diagram of a method 800 for maintaining file 222 with block (instead of byte) differencing. Processing proceeds much as it does in method 700, in that processes 810, 820, 830, and 840 of method 800 are analogous to processes 710, 720, 730, and 740 of method 700. However, process 850 retrieves block statistics of the previous version of file 222 rather than the file itself. The reason for this is that each block is a separate unit of file 222, and only blocks that change as a result of an editor's modification of file 222 need to be conveyed to access server 170. Any suitable type of statistic uniquely descriptive of data within a block, to a desired degree of statistical certainty, can be employed, for example an SHA-1 hash or 32-bit CRC.

Processing proceeds to step 855, which reads the modified (i.e., current) version of file 222. Step 860 then compares statistics of the two versions' blocks, and step 870 creates a delta file of changed blocks with statistics for the modified file's blocks. Step 880 concludes method 800 by optionally deleting statistics for the previous version of file 222.

Exemplary methods 300, 700, and 800 of FIGS. 3, 7, and 8 may be better understood in the context of a more specific example of direct file access, which refers to system 100, file manager 102, and file accessor 198 of FIG. 1. This example may be better understood with reference to TABLE I, TABLE II, and TABLE III below. In the example, system 100 is configured as follows: (1) file accessor 198 has direct file access authorization for editing an example file; (2) the directly accessed file is decrypted and decompressed when opened or saved; (3) e-mail client module 146 is suitably modified to implement custom functions according to various aspects of the invention; and (4) computer 140 implements an additional module (not shown) of the type discussed above that replaces file attachments with file references.

TABLE I begins the description of the example by listing preferred sequences of steps when file accessor 198 accesses a file.

TABLE I

| Event | Primary Actor (FIG. 1) | Action Performed |
|---|---|---|
| 1 | Accessor 198 | Selects attachment with "DFA" extension (attached to e-mail message) provided by e-mail client 146. ("DFA" stands for "Direct File Access," but suitable extension can be used.) |
| 2 | Computer 140 | Upon selection of attachment with "DFA" extension, launches direct file access module 148 (here, software installed on computer 140), which presents dialog box with two options: "Open File" and "Save File" |
| 3 | Accessor 198 | Selects either option-the "DFA" extension is used for the attachment and is registered as an extension so as to activate direct file access module 148, which either: |
| 4(a) | Computer 140 | If "Open File" is selected, downloads the file to a temp or attachments folder, as is conventionally done when an attachment is opened from an e-mail message. |
| 4(b) | Computer 140 | If "Save File" is selected, downloads the file to a location identified by accessor 198. |
| 5 | Computer 140 | While the file is being written to the temp or attachments folder (option a), or the accessor-identified folder (option b), it is also copied to a client database residing in storage 144. The file written there represents a file (revision) that was sent by manager 102. Once this file is stored in the client database, it is available for retrieval by accessor 198, if accessor 198 later selects the "DFA" extension file attached to that message. The need to retrieve the file from access server 198 a second time is thus avoided. Copying the file to this client-side database also maintains the revision relationship between the e-mail message from manager 102 and the "DFA" file reference attachment. |
| 6 | Computer 140 | Records the location of the downloaded file as being in the temp or attachments folder for future reference. |

TABLE II continues the description of the example by listing preferred sequences of steps when file accessor 198 transmits file modifications back to file manager 102.

TABLE II

| Event | Primary Actor (FIG. 1) | Action Performed |
|---|---|---|
| 1 | Accessor 198 | Modifies the file. (Accessor 198 is identified as an editor in this example.) |
| 2 | Accessor 198 | Attaches file to e-mail message and sends message back to manager 102 and any other desired recipients. |
| 3 | Computer 140 | Removes the attached file before the message reaches network connection 14. |
| 4 | Computer 140 | Recognizes the file based on data held in the client-side database in storage 144 and retrieves a copy of the earlier version of the file from the database. |
| 5 | Computer 140 | Compares the earlier and modified versions using a suitable selected differencing engine (byte or block) and creates a delta, i.e., a forward delta. |
| 6 | Computer 140 | Writes delta into the client-side database and tags it there as a sequential delta to the original baseline file downloaded by accessor 198. |
| 7 | Computer 140 | Creates (or updates) delta file containing meta data about the difference, including: Original (baseline) file ID (ties to original message); Current Message Info; Message Originator; Message Recipient(s); Message Subject; Message Date; Current File Info; Modification Date; Modified Size; and Delta Size. |
| 8 | Computer 140 | Sends delta file to access server 170 via network connection 47. |
| 9 | Access Server 170 | Reads the meta data and stores the delta in a database in storage 174 such that it is retrievable from server 174 by file manager 102 and any other specified recipients as: (1) a complete file, for recipients other than file manager 102 who have not retrieved the file previously; or (2) a delta file. |

TABLE III concludes the description of the example by listing preferred sequences of steps when file manager 102 accesses the modified file.

TABLE III

| Event | Primary Actor (FIG. 1) | Action Performed |
|---|---|---|
| 1 | Manager 102 | Selects attachment with "DFA" extension (attached to e-mail message) that was provided by client 116. |
| 2 | Computer 110 | Upon selection of attachment with "DFA" extension, launches module (not shown in FIG. 1), which presents dialog box with two options: "Open File" and "Save File" |
| 3 | Manager 102 | Selects either option-the "DFA" extension on the attachment activates direct file access module 148: |
| 4 | Computer 110 | Based on the delta file and the baseline version of originator 102, reconstructs a version of the file as modified by file accessor 198. |
| 5(a) | Computer 110 | If "Open File" is selected, downloads the reconstructed file to a temp or attachments folder, as is conventionally done when an attachment is opened from an e-mail message. |
| 5(b) | Computer 110 | If "Save File" is selected, downloads the reconstructed file to a location identified by manager 102. |
| 6 | Computer 110 | While the reconstructed file is being written to the temp or attachments folder (option a), or the file manager-identified folder (option b), the delta file is copied to a client database residing in storage 114. The delta file written there represents a file (revision) that was sent by file accessor 198. Copying the delta file to this client-side database maintains the revision relationship between the e-mail message from accessor 198 and the delta file attachment. |
| 7 | Computer 110 | Records the location of the downloaded file as being in the temp or attachments folder for future reference. |

Figure 4:
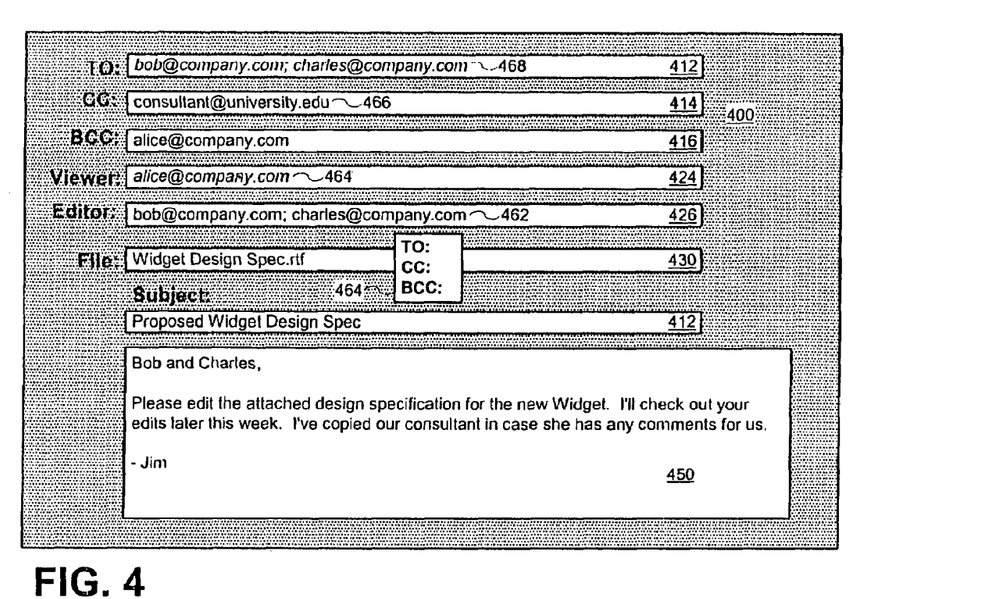
FIGS. 4 and 5 depict two exemplary electronic message windows according to various aspects of the invention.
Figure 5:
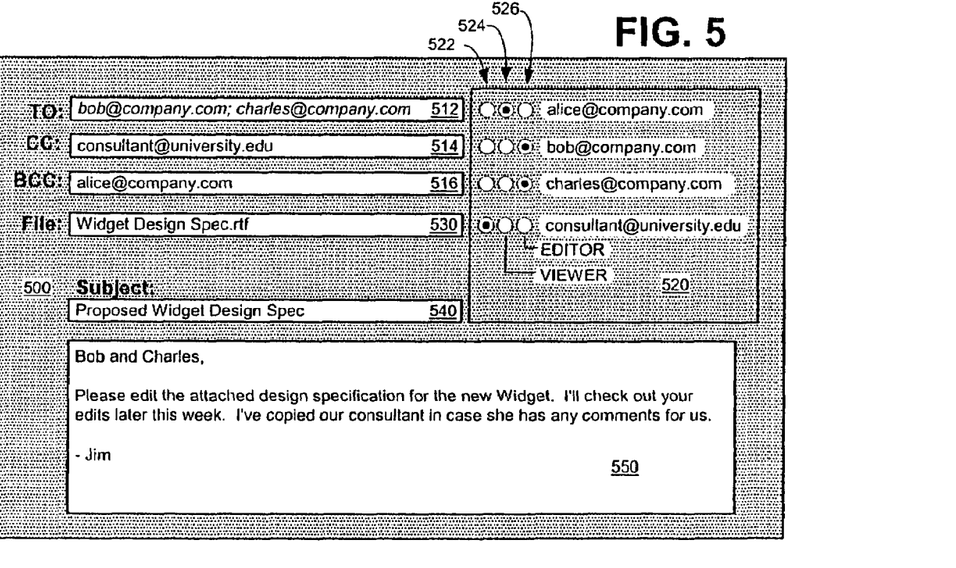

Exemplary systems and methods for manual determination of authorization data may be better understood with reference to FIGS. 4 and 5, which depict respective electronic message windows 400 and 500. An electronic message window according to various aspects of the invention includes any aggregation of visible elements on a computer display that a user would recognize as suitable for the composition of electronic messages. Windows 400 and 500 include, respectively: message recipient fields 412 and 512 labeled "TO:"; secondary message recipient fields 414 and 514 labeled "CC:"; secret secondary message recipient fields 416 and 516 labeled "BCC:"; file identification fields 430 and 530; message subject fields 440 and 540; and message text fields 450 and 550. In variations where the benefits of these fields are not required, some may be omitted.

In accordance with various aspects of the invention, message windows 400 and 500 further include respective file viewer fields and file editor fields. Indicia of a file accessor's address recorded in a file viewer field authorizes that person to view but not modify a file specified in the message window's file identification field. Indicia of the file accessor's address recorded in a file editor field authorizes that person to modify the specified file. A file manager can designate multiple file viewers and file editors in any desired combination by entering multiple addresses in appropriate fields.

In exemplary system 100 and method 200 and 300, file accessor 198 can receive message 224 as a "TO:", "CC:", or "BCC:" message recipient in addition to receiving file access authorization. Other recipients of message 224 need not be informed that accessor 198 has received access authorization in addition to message 224, though message 224 can include publicly readable indicia to that effect if desired.

Window 400 of FIG. 4 includes a file viewer field 424 labeled "Viewer:" and a file editor field labeled "Editor:". (The label text can be in uppercase or lowercase characters, in any words, e.g., in a foreign language, that are linguistic equivalents.) File manager 102 can designate file accessor 198 as a viewer or editor by entering his or her electronic mail address in viewer filed 424 or editor field 426. File manager 102 can also designate accessor 198 as a "TO:", "CC:", or "BCC:" message recipient by entering the address in fields 412, 414, or 416, respectively.

File manager 102 can replicate a file accessor address in a second field of message window 400 by simply retyping the address or cutting and pasting. Advantageous variations of e-mail client module 116 automatically replicate the address to a second field, which is referenced to the field in which the address was originally entered. Thus file manager 102 is relieved of having to type the address twice.

In one such variation, selection of an entered address (e.g., by "right-clicking" on the address with a pointing device) causes a context menu to appear that allows quick designation of an additional field for that address. For example, FIG. 4 depicts a context menu 464 appearing on top of window 400 as a result of right-clicking on address 462 to "charles@company.com". Context menu 464 includes three menu items for replicating the address "charles@company.com" in fields 412, 414, or 416. Similar selection of address 464 to "alice@company.com" causes a context menu (not shown) to appear with menu items "Viewer" and "Editor" for replicating the address in fields 424 or 426. In the example of FIG. 4, file manager 102 has entered "alice@company.com" into "BCC:" field 416 and replicated it to "Viewer:" field 424.

The text of addresses replicated elsewhere can function as hyperlinks. When selected with a pointing device, such text can transfer cursor focus to the referenced address or bring up a context menu (e.g., menu 464) when selected with a pointing device.

Advantageously, manually entered and replicated addresses can appear differently in a message window according to various aspects of the invention. In message window 400, for example, addresses not replicated (e.g., address 466 to "consultant@university.edu") have a first appearance. In window 400, the first appearance is just ordinary text. Addresses originally entered in a field and replicated in another (e.g., address 462) have a second appearance, which in window 400 is underlined text. Addresses replicated from another field (e.g., address 468 in field 412) have a third appearance, which in window 400 is italicized text. The different appearances can also utilize different colors, in which case text having the second appearance can have the blue color commonly found in hyperlinks.

In other advantageous variations of e-mail client module 116, file viewer and file editor fields can have different forms than the conventional "TO:", "CC:", or "BCC:" message recipient fields. For example, window 500 of FIG. 5 includes, in addition to conventional message recipient fields 512-516, a file viewer field 524 and a file editor field 526. In region 520 of exemplary message window 500, fields 524 and 526 each consist of a column of vertically arranged radio buttons. Each row corresponds to an address entered into one of the conventional message recipient fields 512-516.

Conventionally, radio button user interface elements are clustered in groups in which one and only one button is selected. To conform with this convention, region 520 also includes a "no authorization" field 522 of radio buttons. When, for a given address, neither the corresponding "viewer" radio button of field 524 nor the "editor" radio button of field 526 is selected, the corresponding "no authorization" radio button of field 522 becomes selected. Thus, one radio button in each row, for each address, remains selected.

In window 500, the number of rows in each of fields 522, 524, and 526 matches the number of addresses recorded in fields 512-516. Recording of more or fewer addresses will result in more or fewer rows of buttons in region 520. Preferably, the state of a deleted row is retained after it is deleted (such as by using grayed text) so that it can be restored if the corresponding address is again recorded in one of fields 512-516. In system 100 and method 200, for example, file manager 102 may decide to remove "alice@company.com" from "CC:" field 514 and place that address instead in "BCC:" field 516. If file manager 102 identified the address as belonging to a viewer of the file "Widget Design Spec.rtf" when the address was recorded in field 514, he or she is likely to appreciate the convenience of having the same identification appear when the address is recorded in field 516.

In variations where both automatic and manual authorization determination are employed in combination, automatic determinations can produce default identifications of viewers and editors to enhance user convenience. If "bob@company.com" is determined to be an address belonging to an editor having editing privileges of the file "Widget Design Spec.rtf," for example, that address can be automatically replicated to "Viewer:" field 424 of window 400 when entered in field 412, 414, or 416. Similarly, the address can appear in a region 520 of window 500 with its corresponding radio button of field 526 automatically selected when entered in field 512, 514, or 516.

In further variations, automatic determinations of authorization can have a higher priority, overriding any manual identifications of addresses as viewers or editors. An override of manual identification can be visually indicated. For example, some radio buttons in region 520 of window 500 may be "grayed out." Menu items that would otherwise identify an address as a viewer or editor in window 400 may be similarly grayed out.

The examples of FIGS. 4 and 5 illustrate the convenience and simplicity of file access via electronic mail in accordance with various aspects of the invention. In both examples, a manager of the file "Widget Design Spec.rtf" grants three different types of access authorization to four different people with just a simple e-mail message. Two of the people ("Bob" and "Charles"), who are colleagues of the file manager within "Company," are identified as editors having direct access authorization. They are thus able to modify the file, and the file manager instructs Bob and Charles to do so in the body of the message (fields 450 and 550).

Another person ("Alice") within "Company" is also granted direct access authorization to the file, but only to view it. Alice may be a person in a different department that is only involved in a review capacity, or a person having lower seniority within the organization who is authorized only to comment on the file's contents.

A fourth person ("Consultant") at an outside institution "University" is not granted direct file access authorization. This may be due to a number of reasons. For example, the outside institution may not have a compatible network connection to an access server from which the file is directly accessed. As another example, the computer systems administrator for "Company" may have a policy prohibiting direct file access by persons outside the organization's local area network. "Consultant" receives her copy of the file as a conventional attachment to her copy of the message. (The other recipients of the message do not need to receive copies of the file as attachments because they can access the file directly.)

Windows 400 and 500 present the file manager with the familiar, intuitive interface for managing access to the file "Widget Design Spec.rtf." To authorize direct file access, the file manager needs perform only one of three simple tasks. The first option is to enter an e-mail address into a "Viewer:" or "Editor:" field (424 or 426). The second option is to right-click an e-mail address already entered into a conventional "TO:", "CC:", or "BCC:" field (412-416). The third option is to select a radio button. By providing these novel extensions to the familiar user interface found in conventional e-mail systems, the various aspects of the present invention provide the convenience of sending files as attachments while maintaining the benefits of network access to shared files.

The detailed description of preferred exemplary embodiments above mentions the detailed description portions of certain patents and publicly accessible patent applications, all of which are hereby incorporated herein by reference. The detailed description portions of all U.S. patents and patent applications incorporated by reference into these listed patents or applications are also specifically incorporated herein by reference.

PUBLIC NOTICE REGARDING THE SCOPE OF THE INVENTION AND CLAIMS

The inventor considers various elements of the aspects and methods recited in the claims filed with the application as advantageous, perhaps even critical to certain implementations of his invention. However, the inventor regards no particular element as being "essential," except as set forth expressly in any particular claim.

For example, an electronic mail file access system contemplated by the inventor that omits numerous advantageous but non-essential elements determines accessors' authorization status and transmits files by reference or by attachment accordingly, but does not include "viewer" and "editor" fields in an electronic message window.

While the invention has been described in terms of preferred embodiments and generally associated methods, the inventor contemplates that alterations and permutations of the preferred embodiments and methods will become apparent to those skilled in the art upon a reading of the specification and a study of the drawings.

Accordingly, neither the above description of preferred exemplary embodiments nor the abstract defines or constrains the invention. Rather, the issued claims variously define the invention. Each variation of the invention is limited only by the recited limitations of its respective claim, and equivalents thereof, without limitation by other terms not present in the claim. For example, a claim that does not recite limitations regarding viewer and editor fields (which may be recited in other claims) reads on variations that include, and exclude, such elements.

In addition, aspects of the invention are particularly pointed out in the claims using terminology that the inventor regards as having its broadest reasonable interpretation; the more specific interpretations of 35 U.S.C. § 112(6) are only intended in those instances where the terms "means" or "steps" are actually recited. The words "comprising," "including," and "having" are intended as open-ended terminology, with the same meaning as if the phrase "at least" were appended after each instance thereof. Any clause using the term "whereby" merely states the result of the limitations in any claim in which it may appear and does not set forth an additional limitation therein.

What is claimed is:

1. A method for managing file access via an electronic message, the method comprising:
    (a) displaying an electronic message window that includes a plurality of fields including a first field, a second field, and a third field;
    (b) creating an electronic message containing indicia of addresses and a reference to an electronic file, and generating file access authorization data, by:
        (1) accepting, in the first field, indicia identifying one or more addresses to which the electronic message is to be transmitted; and
        (2) either or both:
            (i) accepting, in the second field, indicia identifying one or more addresses of viewers authorized to view the file and generating associated file authorization data; or
            (ii) accepting, in the third field, indicia identifying one or more addresses of editors authorized to modify the file and generating associated file authorization data;
    (c) transmitting the electronic message to the addresses identified by the indicia in the first field; and
    (d) in response to a request for access to the file referenced in the electronic message by a viewer identified in the file access authorization data as authorized to view or modify the file, transmitting data of the file, separately from the electronic message, to the address associated with the requesting viewer.

2. The method of claim 1 wherein transmitting the electronic message further comprises transmitting, in or with the message, a reference to the file, the reference identifying a location of the file.

3. The method of claim 2 wherein transmitting the reference includes transmitting a hyperlink identifying a location of the file.

4. The method of claim 2 wherein transmitting the reference includes transmitting an attachment that includes code implementing a direct file access module.

5. The method of claim 1 further comprising:
    (a) including in the electronic message window a file identification field; and
    (b) accepting indicia identifying the file in the file identification field.

6. The method of claim 1 wherein displaying the electronic message window further comprises displaying a secondary message recipient field and wherein creating an electronic message further comprises accepting in the secondary message recipient field additional indicia of addresses to which the electronic message is to be transmitted.

7. The method of claim 6 wherein displaying the electronic message window further comprises displaying a secret secondary message recipient field and wherein creating an electronic message further comprises accepting in the secret secondary message recipient field additional indicia of addresses to which the electronic message is to be transmitted.

8. The method of claim 7 wherein displaying the electronic message window further comprises displaying labels near respective fields, wherein:
   (a) the first field is labeled "TO:" or a linguistic equivalent thereof;
   (b) the secondary message recipient field is labeled "CC:" or a linguistic equivalent thereof; and
   (c) the secret secondary message field is labeled "BCC:" or a linguistic equivalent thereof.

9. The method of claim 1 wherein displaying the electronic message window comprises displaying:
   (a) the second field with the associated label "VIEWER:" or a linguistic equivalent thereof; and
   (b) the third field with the associated label "EDITOR:" or a linguistic equivalent thereof.

10. The method of claim 1 further comprising transmitting data of the file as an attachment to the electronic message, to addresses identified by indicia recorded in the first field, but not to addresses identified by indicia recorded in the second or third fields.

11. The method of claim 1 wherein displaying an electronic message window further comprises:
   (a) accepting input from a user directing composition of an electronic message; and
   (b) responsive to the input, transmitting display rendering indicia to a window display subsystem to cause display of the electronic message window.

12. The method of claim 11 wherein transmitting the electronic message comprises transmitting a series of data frames, the frames comprising:
   (a) indicia identifying the file;
   (b) a message recipient address frame;
   (c) a file viewer frame including a header and a first set of indicia associated therewith identifying an address of a viewer authorized to view the file; and
   (d) a file editor frame including a header and a second set of indicia associated therewith identifying an address of an editor authorized to modify the file;

13. The method of claim 12 further comprising:
   (a) receiving and displaying the message;
   (b) upon receipt of the message at an address of a person identified as a viewer or editor, permitting access to an image of the file; and
   (c) upon receipt of the message at an address of a person identified as an editor, further permitting access to modify the file.

14. The method of claim 1 wherein at least some of the addresses to which the electronic message is transmitted are within one or more domains distinct from the first domain.

15. A data storage medium comprising instructions for a processor to perform a method for managing access to a file, via an electronic message, the method comprising:
   (a) displaying an electronic message window that includes a plurality of fields including a first field, a second field, and a third field;
   (b) creating an electronic message containing indicia of addresses and a reference to an electronic file, and generating file access authorizing data, by:
      (1) accepting, in the first field, indicia identifying one or more addresses to which the electronic message is to be transmitted; and
      (2) either or both:
         (i) accepting, in the second field, indicia identifying one or more addresses of viewers authorized to view the file and generating associated file access authorization data; or
         (ii) accepting, in the third field, indicia identifying one or more addresses of editors authorized to modify the file and generating associated file access authorization data;
   (c) transmitting indicia of the electronic message to the addresses identifying by the indicia in the first field; and
   (d) in response to a request for access to the file referenced in the electronic message by a viewer identified in the file access authorization data as authorized to view or modify the file, transmitting data of the file, separately from the electronic message, to the address associated with the requesting viewer.

16. The data storage medium of claim 15 further comprising instructions for a processor to transmit, in or with the message, a reference to the file that identifies a location of the file.

17. The data storage medium of claim 16 wherein the reference to be transmitted includes code implementing a direct file access module.

18. The data storage medium of claim 15 further comprising instructions for a processor to display labels near respective fields of the electronic message window, wherein:
   (a) the label for the third field is "TO:" or a linguistic equivalent thereof;
   (b) the label for the first field is "VIEWER:" or a linguistic equivalent thereof; and
   (c) the label for the second field is "EDITOR:" or a linguistic equivalent thereof.

19. The data storage medium of claim 15 further comprising instructions for a processor to transmit data, upon request by a recipient having viewing or editing privileges of the file to an address identified by indicia recorded in the second or third field.

20. A system for managing access, via an electronic message, to a file maintained within a first domain, the system comprising:
   (a) means for accepting, into a first field of the message, indicia identifying addresses of one or more recipients of the message and, accepting into a second and third field, indicia designating each recipient as having viewing or editing privileges of the file respectively; and
   (b) means for transmitting the electronic message to the recipients within one or more domains distinct from the first domain such that, without transferring the file out of the first domain with the electronic message:
      (1) any recipients designated as file viewers and recipients designated as file editors can access the file; and
      (2) any recipients designated as file editors can modify the file.

21. A method for modifying operation of an electronic message program that, during normal operation, (1) displays a message window including a message recipient field and a file identification field and (2) generates an electronic message for transmission to one or more persons, the method comprising:
   (a) causing the electronic message program to display a message window that, further to the message recipient field of part (1), also includes a file viewer field and a file editor field;

(b) causing the electronic message program to accept user input, into an electronic message formed using the message window, of indicia of addresses, and (i) for any addresses inputted into the file viewer field, generating authorization data signifying viewing privileges for a file identified in the file identification field, and (ii) for any addresses inputted into the file editor field editing privileges for the file.

22. The method of claim 21 further comprising, before the acts recited in parts (a) and (b), installing one or more dynamically linked library files to a folder designated for software plug-ins of the electronic message program.

23. The method of claim 21 further comprising reconfiguring the electronic message program such that it no longer causes the transmission of the file as an attachment to the electronic message, for addresses belonging to recipients having viewing or editing privileges of the file and, instead, causes the transmission of the file to such addresses in the form of a reference to the location of the file.

24. The method of claim 23 wherein causing the transmission in the form of a reference to the file comprises transmitting a hyperlink identifying a location of the file.

25. The method of claim 23 further comprising causing the electronic message program to indicate whether the file will be transmitted as an attachment to the electronic message or separately from the message.

26. The method of claim 21 wherein causing the message window to display a message window that further includes a file viewer field and a file editor field includes displaying labels near respective fields, wherein:
  (a) the file viewer field is labeled "VIEWER:" or a linguistic equivalent thereof; and
  (b) the file editor field is labeled "EDITOR:" or a linguistic equivalent thereof.

27. A data storage medium comprising of instructions for a processor to perform a method for modifying operation of an electronic message program that, during normal operation, (1) displays a message window including a message recipient field and a file identification field and (2) generates an electronic message for transmission to one or more persons, the method comprising:
  (a) causing the electronic message program to display a message window that, further to the message recipient field part (1) also includes a file viewer field and a file editor field; and
  (b) causing the electronic message program to accept user input, into an electronic message formed using the message window, of indicia of addresses, and (i) for any addresses inputted into the file viewer field, generating authorization data signifying viewing privileges for a file identified in the file identification field, and (ii) for any addresses inputted into the file editor field, generating authorization data signifying editing privileges for the file.

28. The data storage medium of claim 27 wherein the instructions reside within one or more dynamically linked library files.

29. The data storage medium of claim 28 wherein the dynamically linked library files reside within a plug-in folder of the electronic message program.

30. An electronic message system comprising a computer programmed with an electronic message program that,
  (a) displays a message window including a message recipient field and a file identification field;
  (b) generates an electronic message for transmission to one or more addresses entered into the message recipient field;
  (c) includes, in a location in the electronic message separate from the message recipient field, indicia designating whether addresses entered into the message recipient field are associated with message recipients having viewing privileges of a file entered into the file identification field and whether such addresses are associated with the message recipients having editing privileges; and
  (d) stores authorization data, in a format and location suitable for controlling access to the file, corresponding to the indicia and signifying the identity of message recipients having viewing privileges for the file and the identity of message recipients having editing privileges for the file.

31. A method for managing file access via an electronic message, the method comprising:
  (a) displaying a message window that includes a message recipient field and a file identification field;
  (b) generating an electronic message for transmission to one or more addresses entered into the message recipient field;
  (c) accepting, in at least one location in the message window separate from the message recipient field, indicia designating whether addresses entered into the message recipient field are associated with message recipients having viewing privileges for a file entered into the file identification field and whether such addresses are associated with the message recipients having editing privileges for the file; and
  (d) generating and storing authorization data, in a format and location suitable for controlling access to the file, corresponding to the indicia and signifying the identity of message recipients having viewing privileges for the file and the identity of message recipients having editing privileges for the file.

32. The method of claim 31 further comprising thereafter:
  (a) transmitting the electronic message to the addresses identified by the indicia in the message recipient field; and
  (b) in response to a request for access to the file by a viewer identified in the authorization data as authorized to view or modify the file, transmitting data of the file, separately from the electronic message, to the address associated with the requesting viewer.

* * * * *

UNITED STATES PATENT AND TRADEMARK OFFICE
CERTIFICATE OF CORRECTION

PATENT NO. : 7,409,424 B2 Page 1 of 1
APPLICATION NO. : 09/915719
DATED : August 5, 2008
INVENTOR(S) : James A. Parker It is certified that error appears in the above-identified patent and that said Letters Patent is hereby corrected as shown below:

On page 2 of the patent, under the other publications section, the reference entitled "An Easy-To-Use System for Document Collaboration" change "Easty" to --Easy--

At column 17, line 47 [claim 12] change ";" to --.--

At column 18, line 47 [claim 20] change "accepting" to --accepting,--

At column 19, line 35 [claim 27] after comprising delete "of"

At column 19, line 44 [claim 27] after "field" insert --of--

At column 19, line 44 [claim 27] after "(1)" insert --,--

Signed and Sealed this

Sixteenth Day of December, 2008

JON W. DUDAS
*Director of the United States Patent and Trademark Office*